United States Patent [19]

Coleman

[11] 4,010,984
[45] Mar. 8, 1977

[54] INTERNAL HYDRAULIC SEALING FOR A VEHICLE LOCKING DEVICE

[76] Inventor: James A. Coleman, 2250 E. 105th St., Cleveland, Ohio 44106

[22] Filed: Nov. 3, 1975

[21] Appl. No.: 628,333

[52] U.S. Cl. .............................. 303/89; 137/384.2; 277/116.8
[51] Int. Cl.² ........................................ B60T 17/16
[58] Field of Search ............. 303/89, 1; 137/384.2, 137/375; 188/353, 265; 192/3 H; 180/82 R; 277/116.6, 110, 112, 116.8, 236

[56] References Cited

UNITED STATES PATENTS

| | | | |
|---|---|---|---|
| 3,292,938 | 12/1966 | Tamplen | 277/116.6 X |
| 3,682,195 | 8/1972 | Cvetkovich | 303/89 X |
| 3,771,547 | 11/1973 | Coleman | 137/384.2 X |

*Primary Examiner*—Trygve M. Blix
*Assistant Examiner*—Douglas C. Butler
*Attorney, Agent, or Firm*—Richard H. MacCutcheon

[57] ABSTRACT

For use, for example, in an anti-theft device having a lock, a piston moves in a cylinder having variant bores which provide upper and lower tapers. During factory assembly, a soft metal liner is deformed upon such tapers whereby to prevent, during later operational use, unwanted leakage of a pressure fluid either within or to the outside of the piston-cylinder assembly.

3 Claims, 5 Drawing Figures

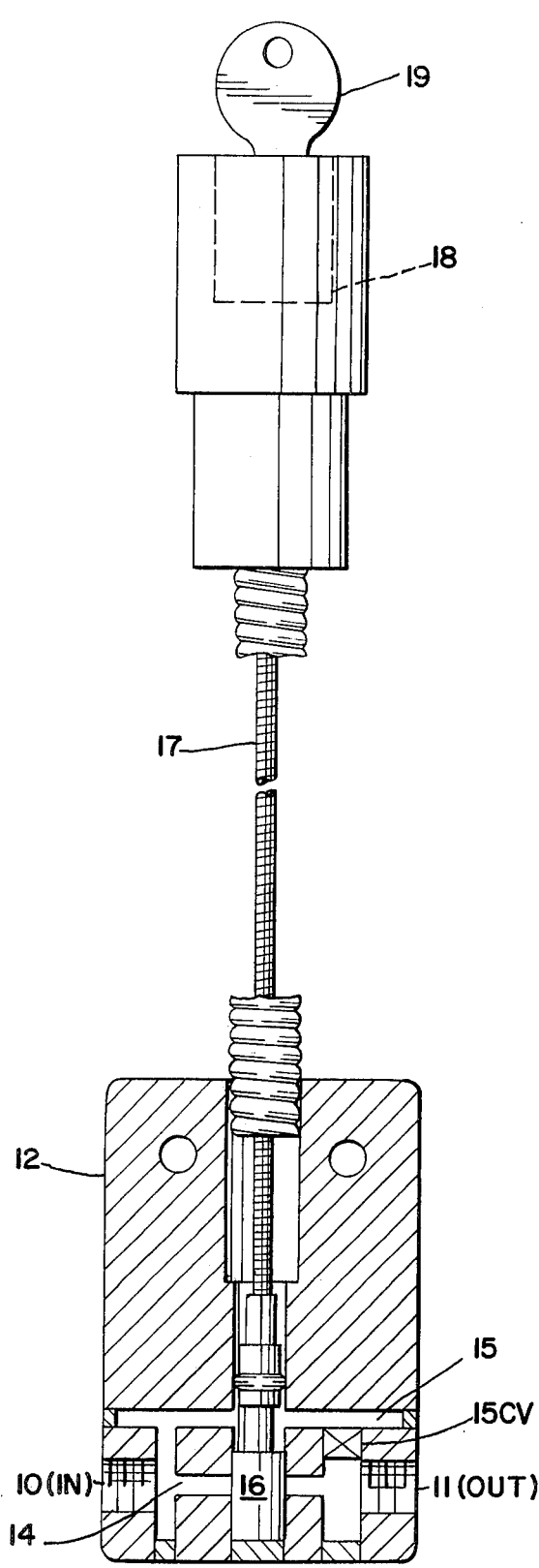
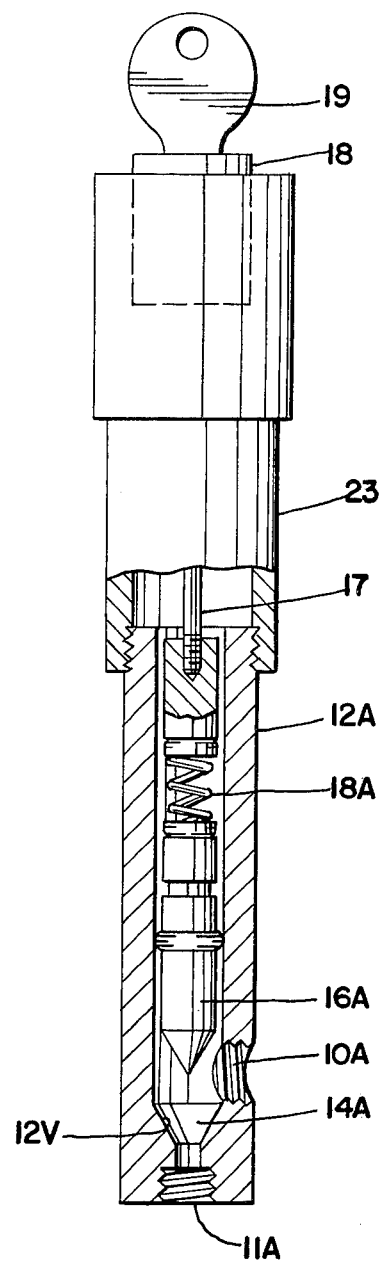
Fig. 1
(prior art)
Fig. 2
(prior art)

INTERNAL HYDRAULIC SEALING FOR A VEHICLE LOCKING DEVICE

CROSS REFERENCE TO RELATED CASES

The present invention proposes or confers improvements on subject matter described in now abandoned 1971 application Ser. No. 175,108 for VEHICLE BRAKE LOCK and related continuation-in-part application which matured into U.S. Pat. 3,771,547 for VEHICLE LOCKS and was issued to me Nov. 13, 1973.

BACKGROUND OF THE INVENTION

As stated in the above applications and patent, an anti-theft locking mechanism for a vehicle is enabled by an authorized person (e.g., owner) and set by an unauthorized person (e.g., thief) and, if associated with an original equipment hydraulic system, includes a piston-cylinder combination which may be selectively enabled or reset by owner but which is "set" by the thief, so that, assuming a brake system is involved, the vehicle can not be further driven, nor pushed, nor towed.

It has been found, however, that with the prior arrangements as described in the patent the deterrent might be adequate only as to a first theif (he uses the brakes in traffic but then the wheels lock up and he has to depart on foot). It is desirable to provide a more stationary brake lock, to deter those unauthorized persons who might later try to move the vehicle.

The problem is one of pressure fluid leakage, both internally of the cylinder provided as part of the vehicle lock-up apparatus, as well as externally, from inside to outside the cylinder.

An object of the present invention is to provide inexpensive means for overcoming the above mentioned difficulties, thereby providing more permanent vehicle locking means as well as an improved piston cylinder arrangement for other uses.

BRIEF DESCRIPTION OF DRAWINGS

Other objects and advantages will become apparent from consideration of the following description taken in connection with the accompanying drawings, in which:

FIG. 1 (labeled "Prior Art" because about the same as FIG. 1 of the prior Patent) shows a locking device in the locked, or closed, position;

FIG. 2 (about same as FIG. 4 of prior Patent) illustrates a modified locking device shown in unlocked, or open, position;

DETAILED DESCRIPTION

Figure 3:
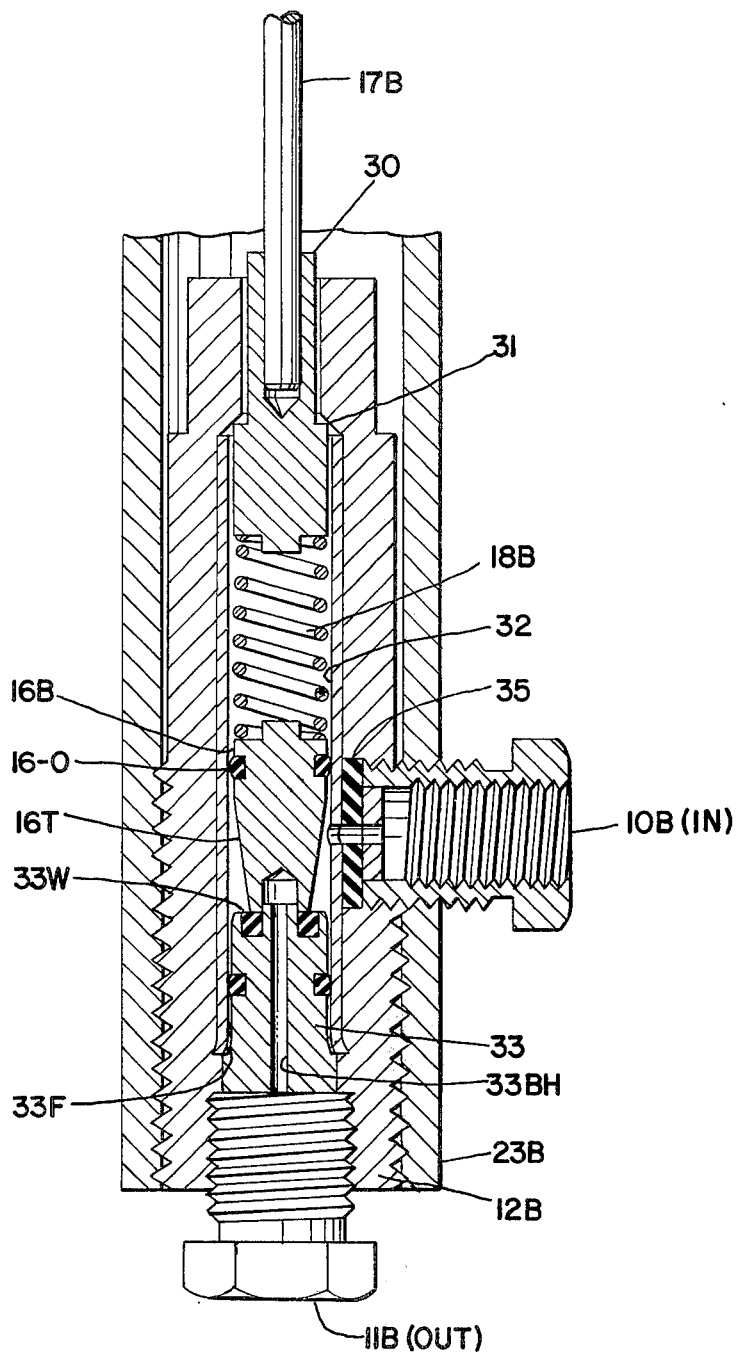
FIG. 3 is a view mostly in cross section and showing a cylinder and piston and valve and tubular valve seat together with multi seals according to various aspects of the present invention.

As in FIGS. 1 and 3, the labels "IN" and "OUT" are merely expressions of convenience not meant to be limiting. For example, for brake action, either the remote master cylinder (not shown) or a remote wheel cylinder (also not shown) may transmit or receive. It all depends on such things as brake pedal pressure and last prior set or reset. If fuller understanding is needed, it can be obtained by reference to the prior Patent.

For FIG. 1, IN port 10 and OUT port 11 are provided in a rectangular block 12, and for authorized operation these ports commmunicate through a main passage 14. Alternatively, for locking, which is the FIG. 1 condition, the only communication is by way of a by-pass channel 15 having a one-way check valve 15CV permitting flow to port 11 and thus, for example, to wheel cylinders. The check valve, intended to prevent flow in opposite direction (e.g., from wheel cylinders to master cylinder) until such time as a valve or piston 16 is raised as by a rod 17 actuable by a lock mechanism 18, has certain disadvantages, one being internal (wrong way) leakage through the check valve over a matter of hours.

In FIG. 2, as in FIG. 1 and in the Patent also, a key 19 is shown, but it need be used only to raise the plunger or valve (16A in FIG. 2) for unlocking, due to wedge and/or spring means more fully described in the patent. Preferably, no key is needed to push lock or push-button 18 down and thus bring valve 16A down for locking. This means that owner is not likely to unintentionally cause locking.

In FIG. 2, valve 16A is provided with a pencil tip type taper which mates with a tapered valve seat 12V in the bore 14A of an annular cylinder block 12A to selectively provide either two-way or just one-way communication between 10A and 11A. It all depends on vehicle owner's intent plus design parameters easily understood by those in the art. However, the arrangement of FIG. 2, and that of FIG. 1 also, has a disadvantage of leakage both internal and external.

FIG. 3 is, as contrasted with the best prior art of FIG. 2, an enlarged view of a piston cylinder having six-way sealing improvements preventing unauthorized vehicle movement even hours after a first theft, and having corresponding advantages for other fields of use.

In FIG. 3, rod or tube 17B carries an enlarged part or portion 30 which has a further enlarged portion 31 which can be thought of as a wedge because of a corresponding enlargement of central bore of cylinder 12B at a certain point along bore taper.

Cylinder 12B may be supported by an outer shell 23 which can extend upward through a vehicle floor and thereabove support a push-button lock located for convenience of human driver operation. The lower end of the part providing rod enlargements 30 and 31 engages a spring 18B whose lower end in turn engages a valve 16B. As shown in FIG. 3, it is assumed that the valve is provided with an 0-ring, 16-0. Lower diameters of 16B taper downwardly inward, as at 16T, but, unlike the pencil tip type lower taper of the valve in FIG. 2, in FIG. 3 the lower portion of the valve outside is frustro conical. A valve seat member 33 has a vertical bore hole, 33BH, communicating with a pipe fitting 11B. Various modifications are possible, even "up" and "down" can be meaningless except as used only as an aid in understanding the drawings, and, of course, the fitting 11B and the valve seat 33 could be made integral instead of separate.

As shown, valve seat 33 carries a resilient material washer, 33W, at its top. Washer 33W is for mating with a ring-like lower end, of the valve 16B, and within the ring of such lower end and thus within the valve an inner bore terminates upwardly as a cone "dead-end". Thus pressure from "IN" or pressure from "OUT" can, to a different extend dependent on design paramters such as tapers, either one of them lift the valve but only at proper times which, insofar as pressure from "out" is concerned, occur only when the valve 16B is not restrained in its downward position.

However, sealing against leakage is of critical importance. To aid in this a copper (or other soft metal) liner 32, originally of uniform o.d. (and I.D.) is inserted in the central bore of cylinder 12B. Near the liner's lower end, the valve seat 33 has a downwardly outer flare 33F. Nearby, the central bore of the cylinder 12B has a corresponding flare, but, during assembly, an accurate (because in-the-factory) wrench pressure on 11B distorts lower portion of copper liner 32 between the two (flares). For clarity, liberties have been taken in the FIG. 3 drawing, and clearances may be shown where, in practice, none should exist. Assume, for example, that a seal or seals is (or are) desired near top of (originally uniform o.d. and i.d.) copper liner 32. Really only the cylinder bore need be flared. Liner 32 will still follow the flare when the liner is forced upward. However, the right angle cross-section of a wedge formed as a top of the enlargement 31 can, as the parts are manipulated during assembly, be just as useful as if it were a taper, as could be true at 33F also. Moreover, the shape functions are reversible. That is, a taper might be inside the soft metal liner, while a right angle or other sort of wedge or anvil might be outside the liner.

As in FIG. 1 or FIG. 2, there is in FIG. 3 an "OUT", but in FIG. 3 this includes outlet fitting 11B, which factory (and thus easily predetermined) wrench pressue causes about six, or seven, or eight seals, as hereinafter defined.

And, as before, there is an "IN", but in FIG. 3 this includes the fitting 10B which is configured and arranged so that with a factory applied wrench pressure a substantially perfect seal is additionally achieved by contact with a resilient sealing washer embedded in side opening of the main valve body 12B.

Figure 4:
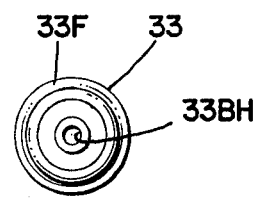
FIG. 4 is a top view of the valve seat (33) of FIG. 3.
Figure 5:
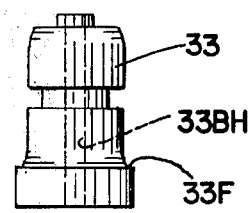
FIG. 5 is an elevational view of the valve seat shown with resilient sealing means removed, for clarity.

In FIG. 4, which is a top view, and in FIG. 5, which is an elevational view, the valve seat 33 may be thought of as shown without its top and side sealing washers or 0-rings.

SUMMARY OF OPERATION

There is thus provided apparatus of the class described capable of meeting objects set forth. Because of modern transmission interlocks (associated with automatic tr. "PARK" or manual tr. "REVERSE") a prevalent method of professional car thieves is to not disturb any interlock or alarm system but, instead, to raise the car from the rear and then tow it to a spot believed safe for partial or total dismantling. But such cars (having key-lock ignition to transmission interlock) having front wheels locked by apparatus according to the present invention not only can not be driven, they can be neither pushed nor towed.

By way of contrast with closest known prior art, the present invention does more than just replace a hard metal valve seat (12V of FIG. 2) with softer, non-ferrous, material for seals. Instead, the present invention, as illustrated in FIG. 3, provides a combination of many seals caused by only a few variables, as follows:

1. O-ring seals such as 16-0 (but also in the patent),
2. Fitting 11B to valve seat 33 bottom,
3. Valve flare 33F to liner 32
4. Cylinder bore taper or flare to liner 32 toward its bottom,
5. Liner 32 to rod enlargement 31,
6. Cylinder bore flare to liner 32 toward its top,
7. Bottom ring of valve 16B with the valve seat washer 33W,
8. Fitting 10B to washer 35 which the fitting pressure can expand.

With the best prior art, as represented in FIG. 2 of the present Application, test vehicles could be started and moved in 3 or 4 hours (an average of 3.5 hrs.) after lock-up. By contrast, test vehicles having identical apparatus except with piston-cylinder arrangements as in FIG. 3 could not be started and moved after a lock-up of 14 hours (a target time), and sometimes not until after 72 hours, for a conservative average of 43 hours, although even the 14 hours provides ample time for owner to follow provided instructions and, if home for a holiday or weekend, go out and reset his brake lock.

There is thus provided not only a good deterrent to a first thief but also a more permanent deterrent such as auto part stores and other volume buyers demand.

While I have illustrated and described a particular embodiment, various modifications may obviously be made.

I claim:
1. In a locking device,
   a ported cylinder,
   a soft metal liner which is coaxially arranged within the cylinder,
   a piston valve located coaxially within the liner,
   a valve seat co-operable for mating said piston valve, said valve seat incorporating a relatively hard metal which has a flared portion for mating with an end of said soft metal liner, and
   a cylinder port fitting having wrench accomodating flats and arranged for threaded engagement advance within the ported cylinder whereby advancement of the valve seat flared portion against the soft metal liner forms an internal seal.
2. In a locking device,
   a cylinder having a central bore of variant diameter such as to provide, when viewed in one direction, a downwardly outer taper for serving as an anvil,
   a copper liner located within the central cylinder bore and adjacent the height of said taper,
   means including a threaded opening in an end of the cylinder and for advancing a "hammer" upon the deformable copper liner and thereby conforming the liner to said taper, and
   a ferrous valve seat which forms at least a portion of the advanceable "hammer".
3. In a locking device,
   a cylinder having a central bore of variant diameter such as to provide, when viewed in one direction, an upper downwardly outer taper and a lower downwardly outer taper for serving as anvils,
   a piston valve within the cylinder,
   a copper liner which is located between the central bore of the cylinder and the piston while said copper liner is also adjacent the height of at least one of said taper anvils,
   means including a threaded opening in one end of the cylinder and for advancing a "hammer" upon the liner and thereby conforming the liner to one or more of the taper anvils,
   a ferrous valve seat which forms at least a portion of the advanceable hammer and itself has a downwardly outer taper, and
   a non-metallic sealing washer interposed between the top of the valve seat and the bottom of the piston valve.

* * * * *